(12) United States Patent
Achten (10) Patent No.: US 9,398,738 B2
(45) Date of Patent: Jul. 26, 2016

(54) SOIL CULTIVATION IMPLEMENT (75) Inventor: Georg Achten, Tönisvorst (DE)

(73) Assignee: LEMKEN GmbH & Co. KG, Alpen (DE)

( * ) Notice: Subject to any disclaimer, the term of this patent is extended or adjusted under 35 U.S.C. 154(b) by 114 days.

(21) Appl. No.: 13/994,956

(22) PCT Filed: Dec. 16, 2011

(86) PCT No.: PCT/DE2011/002155
§ 371 (c)(1),
(2), (4) Date: Jun. 17, 2013

(87) PCT Pub. No.: WO2012/079567
PCT Pub. Date: Jun. 21, 2012

(65) Prior Publication Data
US 2013/0299204 A1   Nov. 14, 2013

(30) Foreign Application Priority Data

Dec. 17, 2010 (DE) .......................... 10 2010 054 946

(51) Int. Cl.
| A01B 5/08 | (2006.01) |
| A01B 21/08 | (2006.01) |
| A01B 49/02 | (2006.01) |

(52) U.S. Cl.
CPC ................. *A01B 5/08* (2013.01); *A01B 21/086* (2013.01); *A01B 49/027* (2013.01)

(58) Field of Classification Search
CPC .................................... A01B 5/04; A01B 5/08
USPC .................................................. 172/178, 574
See application file for complete search history.

(56) References Cited

U.S. PATENT DOCUMENTS

| 876,145 | A | * | 1/1908 | Buchet et al. ................. 172/569 |
| 1,631,639 | A | * | 6/1927 | McDonald ....................... 37/366 |
| 1,740,874 | A | * | 12/1929 | Polhemus et al. ............. 172/582 |
| 1,888,128 | A | * | 11/1932 | Hester ............................ 172/574 |
| 1,944,275 | A | | 1/1934 | Sandeen |
| 2,546,461 | A | * | 3/1951 | Lewis ............................ 172/491 |
| 4,403,662 | A | * | 9/1983 | Dietrich, Sr. .................. 172/156 |
| 4,446,924 | A | * | 5/1984 | Dietrich, Sr. .................. 172/140 |
| 4,542,793 | A | | 9/1985 | Dietrich |
| 4,703,810 | A | * | 11/1987 | Meiners ........................ 172/178 |
| 4,779,684 | A | * | 10/1988 | Schultz ........................... 171/62 |
| 6,276,462 | B1 | | 8/2001 | Dietrich |
| 6,295,938 | B1 | | 10/2001 | Stephen |
| 7,048,069 | B1 | * | 5/2006 | Bollich .......................... 172/187 |
| 2011/0132627 | A1 | | 6/2011 | Gray |

FOREIGN PATENT DOCUMENTS

EP          1449419  A1    8/2004
WO       2008033091  A2    3/2008

* cited by examiner

*Primary Examiner* — Thomas B Will
*Assistant Examiner* — Joel F. Mitchell
(74) *Attorney, Agent, or Firm* — James Creighton Wray; Meera P. Narasimhan (57) ABSTRACT

The invention refers to a soil cultivation implement with two tool rows of hollow discs of a first hollow discs row and of a second hollow discs row. One hollow disc in the first hollow discs row is positioned slightly offset to the rear. In the second hollow discs row there is a hollow disc in a position offset to the front. In order to prevent lateral pull with a soil cultivation implement of this type the hollow discs rows were positioned relatively symmetrically and were offset where the hollow discs point towards each other with their convex sides or with their concave sides. This offset has the effect of optimizing the soil flow and prevents components colliding with each other. This ensures even cultivation over the whole working width of the implement, including in the area of greater working depths with hollow discs that have a larger diameter.

26 Claims, 4 Drawing Sheets

SOIL CULTIVATION IMPLEMENT

This application claims the benefit of German Application No. 10 2010 054 946.0 filed Dec. 17, 2010, and PCT/DE2011/002155 filed Dec. 16, 2011, International Publication No. WO 2012/079567, which are hereby incorporated by reference in their entirety as if fully set forth herein.

The invention refers to a soil cultivation implement with a frame with two successively and obliquely positioned frame parts, on which rotatable hollow discs are positioned in parallel and connected to the frame parts via bearer arms, whereby the hollow discs of the front frame part point with the concave sides in the direction of working obliquely to the front and the outside and the hollow discs of the rear frame part point with the concave sides in the direction of working obliquely to the front and the centre, whereby the chords of the concave sides of the hollow discs form an obtuse angle with the surface of the soil.

Figure 1:
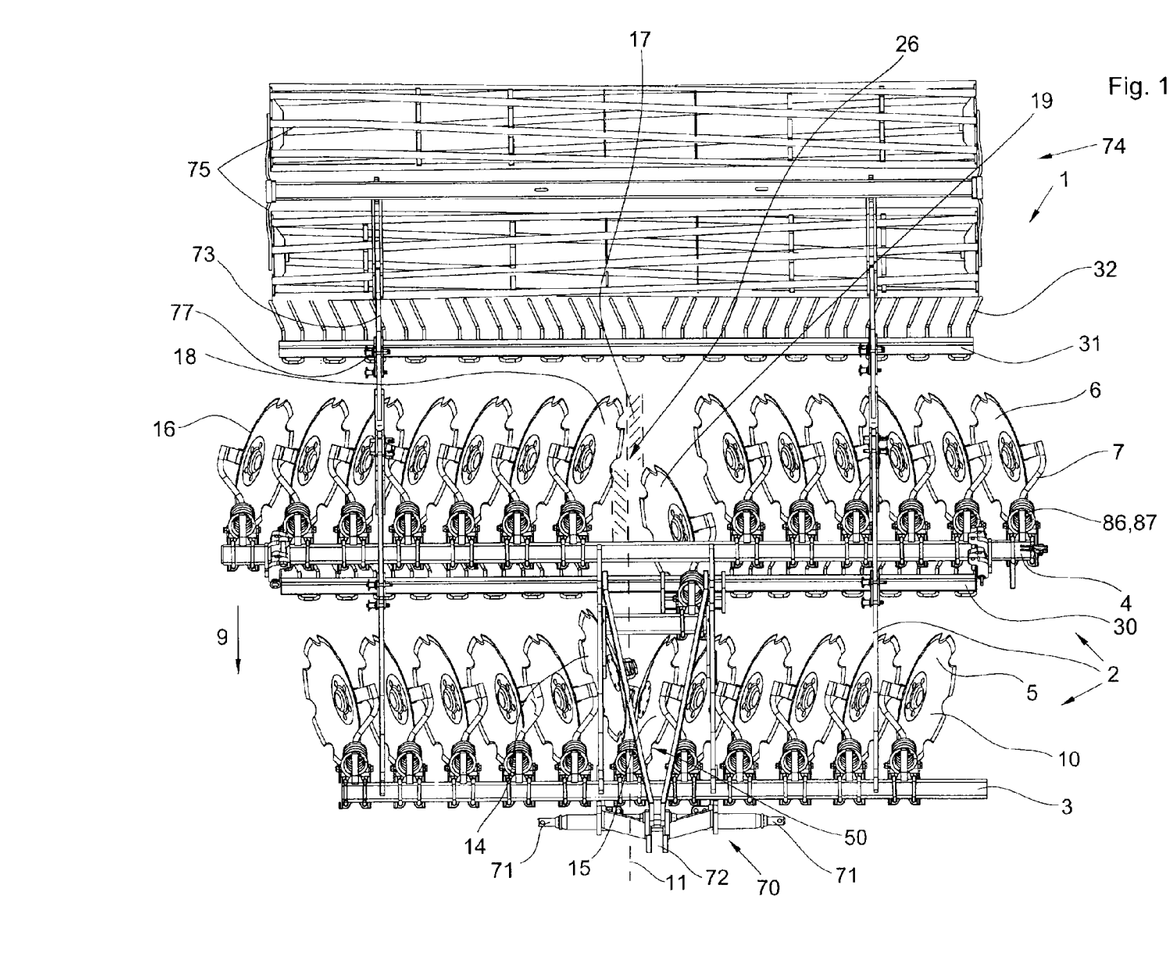
FIG. 1 shows a top view of the soil cultivation implement.

A soil cultivation implement of this type is familiar from US patent specification U.S. Pat. No. 1,944,275. The object of this application is a towed soil cultivation implement with a frame with two frame parts, on which hollow discs with separate bearings are positioned in parallel. The hollow discs of the front frame part are positioned with the concave sides pointing obliquely to the front and the outside and the hollow discs of the rear frame part are positioned pointing to the front and the centre. In this solution, the strips of ground between the two front hollow discs in the centre area of the soil cultivation implement are not tilled, which leaves behind an unevenly tilled field, necessitating increased cultivating effort for the following operations, if a reduction in yield is not intended to be accepted. European patent application EP 1 449 419 also concerns a soil cultivation implement with a frame with two frame parts on which hollow discs with separate bearings are positioned in parallel. The hollow discs of the front frame part are positioned with the concave sides pointing obliquely to the front and to the outside and the hollow discs of the rear frame part are positioned pointing obliquely to the front and to the centre. In FIG. 1 of EP 1 449 419 a solution can be seen in which the angles of the centre hollow discs were altered so that the soil is tilled in the centre section of the soil cultivation implement as well. For this purpose, the obtuse angle to the surface of the ground of the chords of the concave side of the hollow discs was altered so that it is no longer obtuse but acute. The middle hollow discs therefore no longer grip and are unable to penetrate the soil. They create a lift that can only be overcome through the weight of the implement and the penetration properties of the other hollow discs. With harder ground, this lift of the centre hollow discs cannot be overcome sufficiently, even with a heavier weight. The consequence of this is that a usually possible intended cultivating depth is no longer achieved. This considerably limits the use of the soil cultivation implement, in particular if the hollow discs are already slightly worn after longer use and this has reduced the diameter of all hollow discs.

Figure 4:
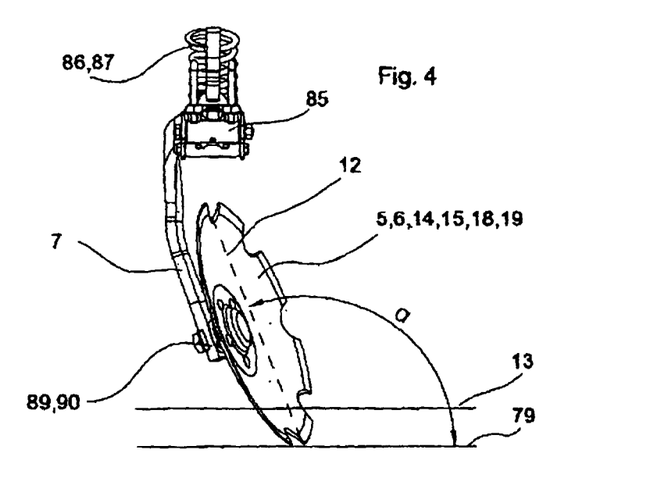
FIG. 4 shows a front view of hollow disc unit and
FIG. 5 a top view of the hollow disc unit.

FIG. 4 of EP 1 449 419 shows a solution in which the angle of the front hollow discs positioned in the middle section was not altered. Rather, the untilled cultivating strip between these hollow discs in the front row is tilled by the hollow discs of the back row. Because of the clearance problems, one of the two rear hollow discs that are positioned with their concave sides pointing to each other was positioned in the direction of working offset to the front. While this embodiment ensures relatively even cultivating of the soil, this is not nearly sufficient and is only possible in combination with very small and very steeply pitched hollow discs. Blockage problems in the front section of the implement, in particular with a great deal of vegetation and deep cultivating depths, cannot be effectively avoided in this way.

The familiar solutions have the disadvantage that the ground is not tilled evenly over the whole cultivating width, that blockages arising from clearance problems cannot be prevented and that the soil flow is not managed optimally. The consequence of this is usually that the soil has to be tilled again subsequently in order to achieve an evenly cultivated field, or a sufficiently good seed bed.

The task of the invention is to create an appropriate soil cultivation implement that is suitable for high cultivating speeds, in which the tools are distributed evenly over the cultivating width and cultivate the soil evenly, that is structured simply and compactly and also works without blockages.

In accordance with the invention the task is solved with a first embodiment of the invention in accordance with the elements of the characterising part of Claim 1, whereby advantageously supplementing and alternative solutions are claimed in the further patent claims.

The offsetting of the hollow discs in the middle section of the front frame part means that larger hollow discs with stable bearings can also be positioned with a small lateral clearance between them maintaining the given optimum obtuse angle to the surface of the soil, without having to accept losses of effectiveness and without the danger that blockages may occur. In an age in which intensity and area output are absolutely essential, agricultural and plant concerns have to be taken into account as well. This can be realised in a special way with the solution in accordance with the invention.

According to a second embodiment, the task in accordance with the invention is solved in accordance with the elements of the characterising part of Claim 2. The two hollow discs in the middle section of the front frame part point towards one another with their concave sides and are positioned in the direction of working offset to one another. In contrast to the embodiment in which the hollow discs of the front frame part convey the soil to the outside and the hollow discs of the rear frame part transport the soil to the middle, this is done in the reverse direction in this embodiment. The hollow discs of the rear frame part peel the soil and transport it to the outside. Appropriate edge tools ensure that the soil is deposited in such a way that it is not transported beyond the actual work area of the soil cultivation implement. Here as well, the hollow discs in the middle section of the front frame part are positioned offset, to prevent blockages and to ensure the most evenly possible cultivating over the whole working width.

The invention provides in addition that the two hollow discs that point to each other with their convex sides in the middle section of the rear frame part are positioned in the direction of working offset to one another. In order to prevent blockages of the hollow discs that are positioned in the middle section of the rear frame part as well, these hollow discs are positioned offset to one another, practically for the same reasons as those already mentioned. In the same way as already mentioned, these alternative embodiments have holding-down devices that ensure that the peeled off soil is deposited specifically and that the tools positioned behind the holding-down devices are not hindered in their working effect.

It is practical if the offset between the offset positioned hollow discs in the direction of working corresponds to a dimension of 5 cm and more, preferably to a dimension that corresponds to approx. 30% of the diameter of a hollow disc. In case of self-propelled, towed or hitched soil cultivation implements a larger offset can be chosen as well. The larger the offset, the more the angle of the hollow disc can be optimised without its effectiveness being limited through construction requirement of the soil cultivation implement. However, this can be reduced to a dimension that the overall length of the implement does not become unnecessarily large and in this way the soil cultivation implement in accordance with the invention cannot be used just as a towed implement, but also as an attached implement that has to be carried by the tractor completely for a period. Depending on the diameter of the hollow disc, a dimension of 5 cm can be sufficient, whereby depending on the components, such as support arm and bearings of the hollow disc, an offset is advantageous that corresponds to roughly 30% of the diameter of a hollow disc. With a towed soil cultivation implement, in which the existing hoist power of the tractor does not play such a great part, this offset can be even larger than 30% of the diameter of a hollow disc.

In a further embodiment of the invention it is noticed that the clearance of the centres of the cultivating cross-sections between the hollow discs of the front frame part showing towards each other with their convex sides seen in the direction of working is about 1.2 to 3 times larger than the clearance of the centres of the cultivating cross-sections of the adjacent hollow discs of the front frame part to one another, preferably 1.5 times larger. More or less even cultivating is achieved depending on the allocation of the position of the hollow discs of the rear frame part in relation to the hollow discs of the front frame part, and thus the situation of the centres of the cultivating cross-sections. The two hollow discs that are located in the middle section of the front frame part leave behind an untilled cultivating strip between them, which is then tilled by either one or two hollow discs of the rear frame part. It is advantageous that two hollow discs of the rear frame part till the remaining untilled strip of soil. Consequently, the clearance between the centres of the cultivating cross-sections of the two hollows discs pointing to each other with their convex sides should by 1.5 times greater than the clearance of the centres of the cultivating cross-sections of the adjacent hollow discs, which are positioned directly in parallel.

The invention provides further that the two hollow discs that point to each other with their concave sides in the middle section of the rear frame part are positioned offset to each other in the direction of working. With this measure it is ensured in the middle section of the rear frame part as well that the hollow discs that point towards each other with their concave sides do not hinder each other but are still positioned with an optimum clearance to one another so that very good cultivating results can be achieved.

With regard to the offset of the two hollow discs in the direction of working it is provided that this corresponds to a dimension of at least 15 cm, preferably a dimension that corresponds to approx. 50% of the diameter of a hollow disc. A larger offset can be chosen with self-propelled, towed or hitched soil cultivation implements. An offset of about 15 cm can prevent blockages in dependence on the diameter of the hollow discs and of the soil peeled off by the hollow disc. In combination with larger hollow discs and greater cultivating depths as well, the invention provides for an offset with a dimension that corresponds to about 50% of the diameter of a hollow disc. Depending on the angle of the hollow discs, a slightly smaller or larger dimension of the offset can improve the performance capability of the soil cultivation implement.

The invention provides further that for wide cultivating or folding soil cultivation implements both the front frame part and the rear frame part are multi-part. Implements that are used with a small working width require only a single front and a single rear frame part respectively. For implements with a greater working width the invention provides that both front frame part and the rear frame part are multi-part, in order to guarantee good adjustment of the individual hollow discs to the ground. This applies analogously as well to foldable soil cultivation implements. The invention does not rule out soil cultivation implements with a small cultivating width having multi-part frame parts as well where required.

One proposal for the distribution of the hollow discs over the complete soil cultivation implement provides that the number of hollow discs planned for the soil cultivation implement is an even number greater than twenty and is not divisible by four. Because of this comparatively large total number of hollow discs, above all implements with a larger working width or foldable implements are conceived. Basically, an arrangement of this type corresponds to an implement with an even number of hollow discs in the front row and a number increased by two in the rear row. This leads advantageously to displacement of the centre of symmetry of the hollow discs, e.g. by a half disc clearance. In this way, an absolutely symmetrically loaded implement with balance force distribution is created, in which lateral pull or oblique raking cannot occur, if the same number of hollow discs is positioned on the left and the right of the middle of the implement both on the front frame part and on the rear frame part and, e.g., convey earth in the front from the middle to the outside, or in the rear convey earth from the outside in the direction of the middle of the implement.

As far as the position of the hollow discs is concerned, it is noticed that at least one of the two hollow discs that are positioned in the middle section of the front frame part is less oblique in angle $\alpha$ than the remaining hollow discs and the earth flow of the peeled off soil formed as far as possible to flow past the hollow discs positioned behind them as far as possible. In an individual case, the offset of the hollow discs in the middle section of both the front frame part and of the rear frame part may have a slight influence on the earth flow of the peeled off soil. This influence does not have to have a negative agricultural effect, but can have an effect on even cultivating, which can be compensated for with a change to the angle of the hollow discs. Through the change to angle the earth flow can be led and guided in such a way that the hollow discs positioned behind this are not hindered in their cultivating effect and neither is the evenness of the cultivating itself.

Alternatively, the invention provides that at least one of the middle hollow discs of the front frame part is curved flatter than the remaining hollow discs and in this way the earth flow of the peeled off soil is guided to the greatest extent past the hollow discs positioned behind this. In order, as previously mentioned, to optimise the earth flow of the peeled off soil through a different angle of the hollow discs to the surface of soil, this is now done through hollow discs that are slightly less concave. The earth flow is then also guided and led so that the rear hollow discs are not obstructed and the evenness of the cultivating is not restricted.

In supplement to the previous measures it is provided that holding-down devices, which are positioned behind the hollow discs, are assigned to the hollow discs of the front frame part or of the front frame parts and/or of the rear frame part or the rear frame parts. These holding-down devices are designed so that they guide the soil peeled off by the hollow discs in such a way that the following hollow discs, which are positioned on the rear frame part, are not obstructed. The soil that is peeled off by the hollow discs of the front frame part and discharged to the side is collected by the holding-down devices and deposited. The allocation of holding-down devices behind the hollow discs of the rear frame part prevents following tools, e.g. a roller, from being obstructed by the peeled off and thrown up soil. At high cultivating speeds in particular it is not possible to guide peeled off soil in such a way that following tools are not obstructed. Through the holding-down devices the peeled off soil is virtually settled and deposited so that following tools can carry out their function as planned without obstruction. In the variant of the invention in which holding-down devices that are positioned behind the hollow discs are assigned to the hollow discs of the front frame part or of the front frame parts and/or of the rear frame part or the rear frame parts, it is always ensured that the tools that are positioned in each case behind a holding-down device are not obstructed by the earth flow created by the hollow discs and therefore achieve the intended soil cultivation effect.

It is provided further that the holding-down devices are constructed as single-piece or multipart screening elements that take up the soil peeled off by the hollow discs and replace it on the soil surface, whereby the screening elements are constructed preferably flexibly. Because the metal or plastic holding-down devices or the screening elements and, e.g. are constructed flexibly because of the selection of their cross-section, soil cannot adhere even in clammy soil conditions. Because of the give or the movement of these components, soil that is taken up falls off immediately and is deposited.

Guide parts, tines, or for example, harrow tines, are planned as holding-down devices or as screening elements and divert the soil that is peeled off and pushed to the side by the hollow discs at least to an extent in the opposite direction. For example, the soil of the first hollow discs row is conveyed to the outside and the soil that is tilled by the rear hollow discs row is conveyed to the middle. This means that grooves or furrows can remain in the edge area of the work area of the soil cultivation implement. The soil that is collected by the holding-down devices or the guide parts is in this way led back to the side in such a way that the grooves and furrows generated in the outer area by the outermost hollow discs are refilled with soil and smoothed.

The invention provides in particular as well that the hollow discs have a diameter between 50 cm and 75 cm, preferably a diameter of 60 cm to 70 cm. With larger diameters of the hollow discs deeper cultivating depths can be achieved as well, included cultivating depths that normally require a soil cultivation implement such as a cultivator with tines and shares. In combination with an implement with hollow discs in the embodiment in accordance with the invention working depths can be achieved as with a cultivator, but with a lower tractive force requirement, with higher speeds and thus with larger area outputs.

Further details of the invention can be seen in the description of the figures. These are as follows.

BRIEF DESCRIPTION OF THE DRAWINGS

DETAILED DESCRIPTION

FIG. 1 shows a top view of the soil cultivation implement 1. The soil cultivation implement 1 can be a trailed, a hitched or an attached soil cultivation implement 1. FIG. 1 represents the embodiment of an attached soil cultivation implement 1. The three-point linkage 70 serves for the attachment to the three-point linkage of a tractor that is not shown. For this purpose the three-point linkage 70 has lower link points 71 and the upper link attachment point 72. The three-point linkage 70 is connected with frame 2, which consists among other things of a front frame part 3 and a rear frame part 4. Hollow discs 5 are positioned on front frame part 3 and hollow discs 6 on the rear frame part 4. Seen from the centre 11, the concave sides 10 of the hollow discs 5 point obliquely to the front and outwards seen from the direction of working 9. In the middle 11 or in middle section 50 hollow discs 5, namely hollow discs 14 and 15, are positioned so that they point towards each other with their convex sides 16. The individual hollow discs 5, 14 and 15 are positioned in such a way that their chords 12 of the respective concave side 10 form an obtuse angle α to the surface of the soil 13. This can be seen in particular in FIG. 4 as well. In the middle section 50 hollow disc 14 is in a position offset to the rear seen from the direction of working 9. The offset is chosen so that the supporting components of the hollow discs 14 and 15, namely the support arms 7, the axles 89 of hollow discs 14 and 15 and the bearings 90 cannot collide, even if in case of overload one of the two hollow discs 14 and 15 swerves to the rear and upwards. A spring 86, which is a component of an overload protection 87, holds the respective hollow disc 5, 14 and 15 in the working position. Rear frame part 4, which holds hollow discs 6, is fastened to frame 2 as well. The hollow discs 6 are positioned here in such a way that they point with their concave sides 10 in the direction of working 9 obliquely to the front and to the middle 11. The chords 12 of the concave sides 10 of hollow discs 6 form an obtuse angle α with the surface of the soil 13. Hollow discs 18 and 19, which point towards each other with the concave sides, are located in the middle 11 of the rear frame part 4. In order to prevent blockages and to optimise the earth flow in the middle section 26 between these discs 18 and 19, hollow disc 19 is in a position offset to the front. An untilled strip 17 remains between the two hollow discs 14 and 15, which are positioned on the front frame part 3. This strip 17, which is offset from the middle, is tilled by the two hollow discs 18 and 19. At high cultivating speeds in particular hollow discs 5 and 6 throw the soil up in such a way so that following soil cultivation implements can be obstructed in their function. In order to prevent this, holding-down devices 30 are located behind hollow discs 5 and holding-down devices 31 behind hollow discs 6. Holding-down devices 30 or 31 consist here of harrow tines 32, which are positioned in such a way that they return the soil that is moved to the side by hollow discs 5 and 6 as far as possible in the opposite direction. Frame 2 supports not only front frame part 3 and rear frame part 4, but also the beams 73 to which the roller 74 is fastened. The roller 74 consists in this case of two roller bodies 75. Depending on the soil type and the required cultivating effect, rollers can also be used here that achieve a greater packing effect, cutting effect or crumble effect as well.

Figure 2:
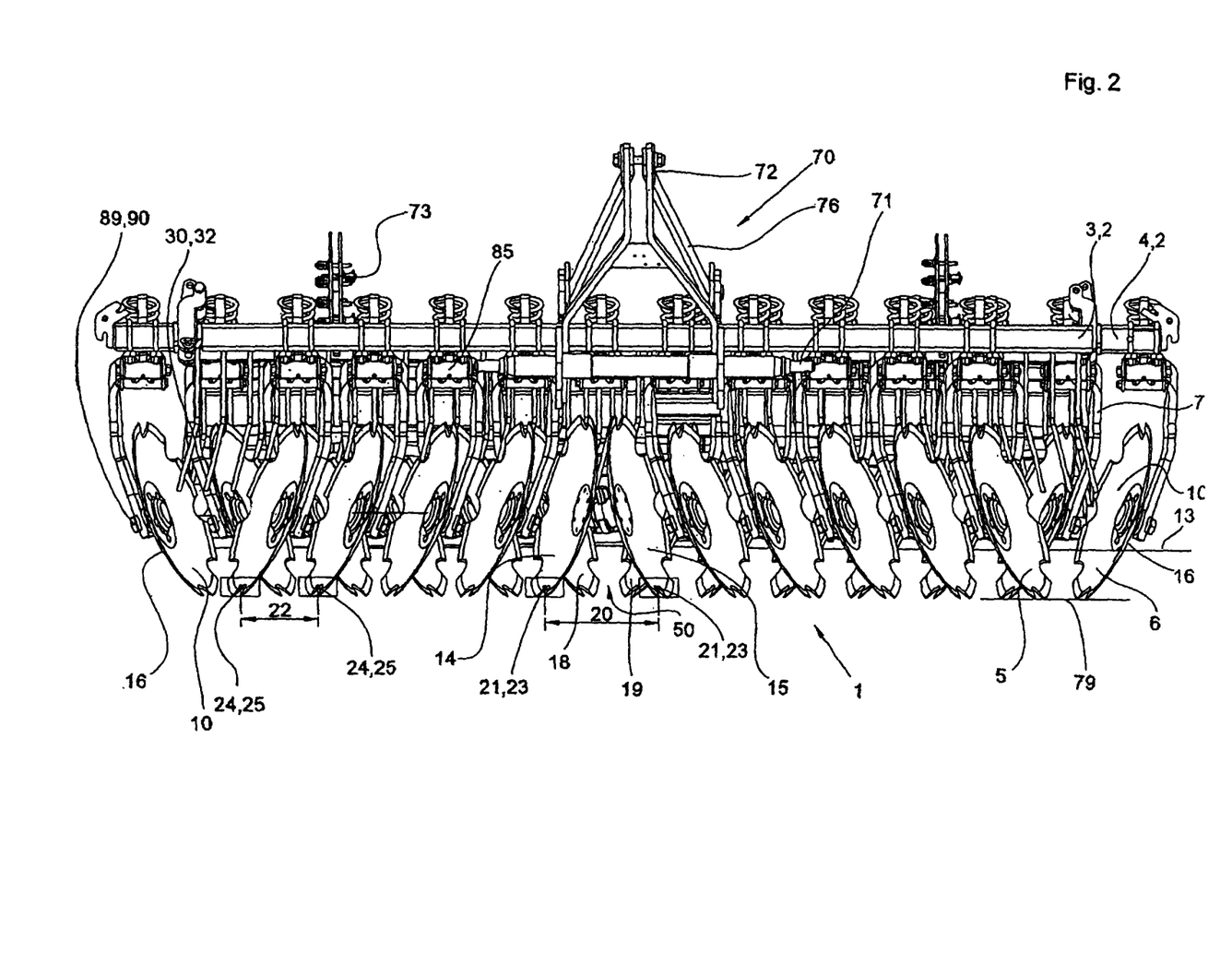
FIG. 2 shows a front view of the soil cultivation implement.

FIG. 2 shows a front view of the soil cultivation implement 1. It makes clear in particular that hollow discs 5, 6, 14, 15, 18 and 19 are positioned so that the soil is evenly tilled over the whole working width of soil cultivation implement 1. Each of the previously designated hollow discs works a cultivation cross-section 23 or 25. Cultivation cross-sections 23 are those that are tilled by hollow discs 14 and 15, which are located in the middle section 50 of the soil cultivation implement 1. The cultivation cross-sections that are tilled by hollow disc 5, which are not located in the middle section 50 of the soil cultivation implement 1, are designated 25. A centre 21 or 24 is allocated to the respective cultivation cross-section 23, 25. Here the clearance 20 between the centres 21 of the cultivation cross-sections 23 of hollow discs 14 and 15 is about 1.5 times larger than the clearance 22 of centres 24 of cultivation cross-sections 25. This division of the hollow discs 5, 14 and 15 has the effect that a cultivation strip 17 remains in the middle section 50 that is tilled by the rear hollow discs 18 and 19. All hollow discs 5 and 6, 14 and 15 and 18 and 19 are positioned so that each hollow disc works a cultivation cross-section 23, 25 of roughly the same size, which has the effect that an even soil cultivating effect is achieved over the whole working width. In FIG. 2 the surface of the soil 13 and the cultivating horizon 79 of the hollow discs are indicated. The difference between the height position of surface of the soil 13 and of the cultivating horizon 79 corresponds to the working depth of hollow discs 5 and 6.

Figure 3:
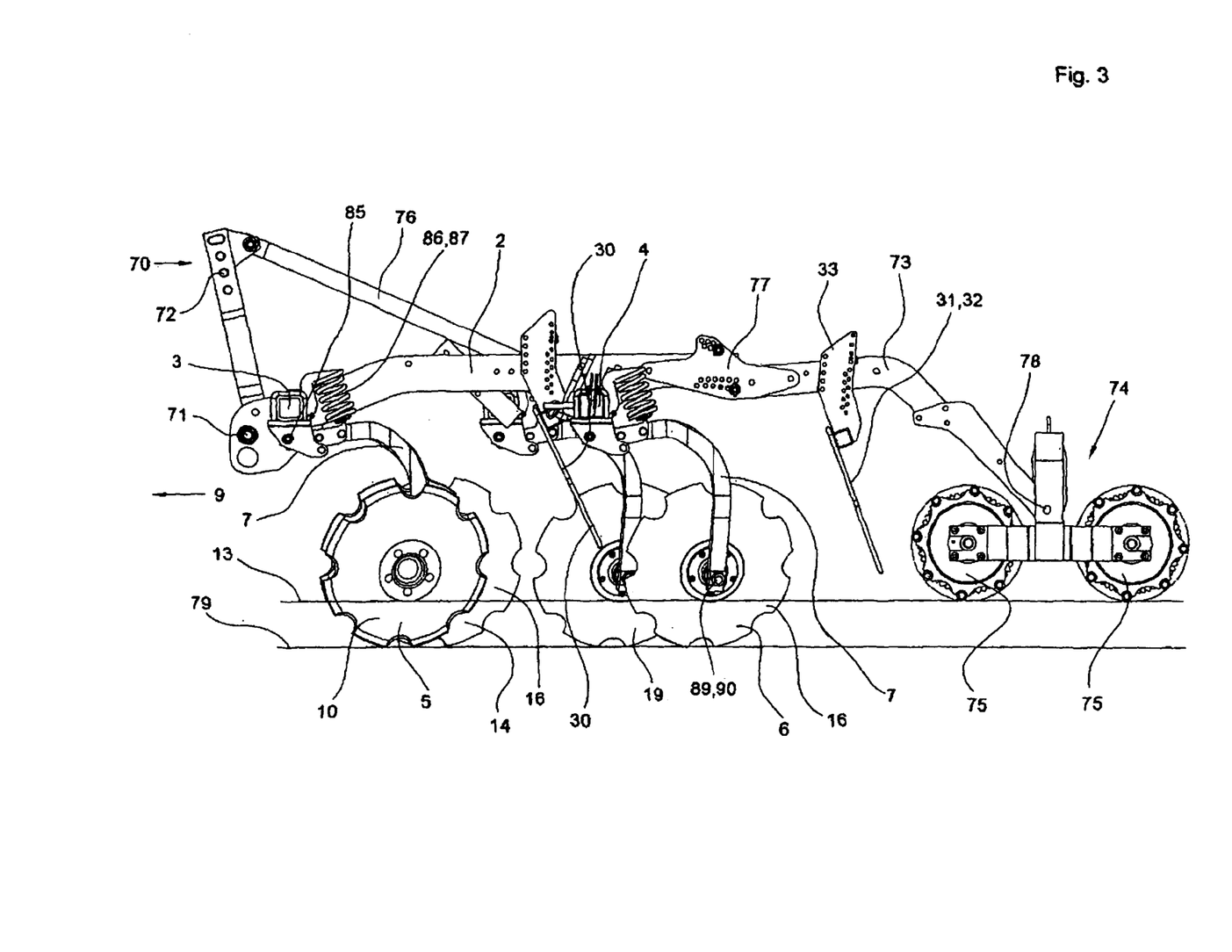
FIG. 3 shows a side view of the soil cultivation implement.

FIG. 3 shows a side view of the soil cultivation implement 1. It makes clear that the three-point linkage 70 is connected to frame 2 through the support 76. FIG. 3 also shows the fastening of the hollow discs 5 and 6 with the frame parts 3 and 4 through axles 98, bearings 90, support arms 7, swivelling axle 85, overload protection 87 with spring 86. The offset in the direction of working 9 is much smaller between the hollow discs 14 and 15 or 5 than the offset between hollow discs 6 or 18 and 19. The holding-down devices 30 and 31 with the harrow tines 32 are positioned so that they take up the soil that is thrown up by hollow discs 5 and 6 and deposit it on the ground. The holding-down devices 30 ensure that the hollow discs 6 are not obstructed by the soil thrown up by hollow discs 5. The holding-down devices 31 ensure that the soil thrown up by hollow discs 6 does not obstruct the run of roller 74. Adapted to the respective function, holding-down devices 30 and 31 are positioned more or less closely to the surface of the soil 13. The working depth of the soil cultivation implement 1 is set using the depth setting device 77. Holding-down devices 31 or 32 each has an adjusting device 33 with which they can be set with regard to angle and depth as well.

FIG. 4 contains a front view of a disc unit with hollow discs 5, 6, 14, 15, 18 or 19. It makes clear how the chord 12 of the concave side 10 of the respective hollow disc forms an obtuse angle α to the surface of the soil 13 or to the cultivating horizon 79 of the hollow discs. The respective hollow disc has an axle 89 and bearing 90 with which it is connected to the support arm 7. The support arm 7 is connected via the swivelling axle 85 with the respective frame part 3 or 4 and is held in the cultivating position with spring 86 via the overload protection 87. The solution in accordance with the invention is conceivable, e.g. with hollow discs on separate bearings or two hollow discs of the same size on a support arm 7. In addition, hollow discs on joint bearings on a support arm 7 with axles displaced towards each other and/or hollow discs with different diameters can be used.

Figure 5:
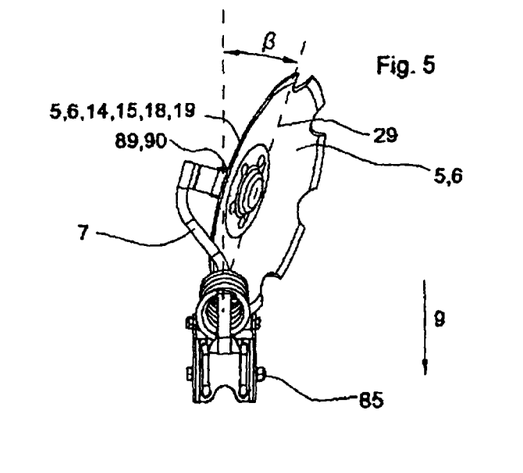

FIG. 5 shows a top view of the hollow disc unit that makes clear the oblique position of the respective hollow disc in the direction of working 9. The hollow discs 14 and 15, which are located in the middle section 50 on the front frame part 3, have preferably a slightly smaller angle α and where applicable a smaller angle β as well. This then ensures that the earth flow that is produced by hollow disc 14 is guided to the rear flatter. Because of the offset of hollow disc 14 to the rear, a holding-down device 30 there has to be constructed slightly differently. In order to achieve in sum an even soil cultivating effect the angle α and possibly angle β as well of the hollow disc have to be altered slightly. A hollow disc 14 with slightly less convexity can achieve a similar effect.

The invention claimed is:

1. Soil cultivation implement (1) comprising a frame (2) including a front frame part (3) and a rear frame part (4), and rotating hollow discs (5, 6), including concave sides positioned in parallel and connected to each of the front and the rear frame parts (3, 4) through support arms (7), the hollow discs (5) on the front frame part (3) seen in a direction of working (9) point obliquely to a front and to an outside with concave sides (10) in the direction of working (9) and the hollow discs (6) on the rear frame part (4) seen in the direction of working (9) point with the concave sides (10) obliquely to the front and to a centre (11) in the direction of working, chords (12) on the concave sides (10) of the hollow discs (5, 6) form an obtuse angle (α) with a soil surface (13), two front hollow discs (14, 15) of the hollow discs on the front frame part (3) located in a front middle section (50) of the front frame part (3) point towards each other with convex sides (16), the two front hollow discs are offset towards each other relative to other discs of the hollow discs on the front frame part and the two front hollow discs are offset from each other in the direction of working (9) forming a cultivation strip, two rear hollow discs of the hollow discs (6) located in a rear middle section of the rear frame part (4) point towards each other with their concave sides (10), and at least one of the two rear hollow discs is positioned left or right of the cultivation strip (17) for tilling the cultivation strip.

2. Soil cultivation implement (1) comprising a frame (2) including a front frame part and a rear frame part positioned in tandem and transversely, and hollow discs (5, 6) with swivelling bearings are positioned in parallel and connected to the front and the rear frame parts (3, 4) through support arms (7), the hollow discs (5) the front frame part (3) seen in a direction of working (9) point obliquely to a front and to an outside with concave sides (10) in the direction of working (9) and the hollow discs (6) on the rear frame part (4) seen in the direction of working (9) point with the concave sides (10) obliquely to the front and to a centre (11) in the direction of working, chords (12) on the concave sides (10) of the hollow discs (5, 6) form an obtuse angle (α) with a soil surface (13), wherein two front hollow discs of the hollow discs on the front frame part in a front middle section (50) of the front frame part (3) point towards each other with convex sides (10) and the two front hollow discs are positioned offset towards each other in the direction of working (7) relative to other discs of the hollow discs on the front frame part.

3. Soil cultivation implement in accordance with claim 2, wherein two rear hollow discs of the hollow discs on the rear frame part point towards each other with concave sides (16) in a rear middle section (26) of the rear frame part (4) and the two rear hollow discs are positioned offset towards each other in the direction of working (9).

4. Soil cultivation implement in accordance with claim 1, wherein the offset between the front hollow discs (14, 15) offset towards each other corresponds to a dimension of 5 cm and more in the direction of working (9).

5. Soil cultivation implement in accordance with claim 1, wherein a first clearance (20) of first centres (21) of first cultivation cross-sections (23) between the two front hollow discs (14) (15) of the front frame part (3) pointing towards each other with their convex sides (16) seen in the direction of working (9) is about 1.2 to 3 times greater than a second clearance (22) to one another of second centres (24) of second cultivation cross-sections (25) of the hollow discs (5) on the front frame part (3) adjacent to the two front hollow discs.

6. Soil cultivation implement in accordance with claim 1, wherein the two rear hollow discs (18, 19) that point towards each other with the concave sides (10) in the rear middle section (26) of the rear frame part (4) are positioned offset relative to each other in the direction of working (9).

7. Soil cultivation implement in accordance with claim 6, wherein the offset of the two rear hollow discs (18, 19) in the direction of working (9) corresponds to a dimension of at least 15 cm.

8. Soil cultivation implement in accordance with claim 1, wherein for wide cultivating or foldable soil cultivation implements (1) both the front frame part (3) and the rear frame part (4) are constructed in several parts.

9. Soil cultivation implement in accordance with claim 1, wherein a number of the hollow discs (5, 6, 14, 15, 18, 19) of the soil cultivation implement (1) is an even number greater than twenty and is not divisible by four.

10. Soil cultivation implement in accordance with claim 1, wherein at least one of the two front hollow discs (14, 15) positioned in the front middle section (50) of the front frame part (3) is at a less obtuse angle ($\alpha$) than remaining hollow discs (5) of the front frame part and earth flow of peeled off soil is formed to flow to a greatest extent past the two rear hollow discs (18, 19) positioned behind at least one of the two front hollow discs.

11. Soil cultivation implement in accordance with claim 1, wherein one of the two front hollow discs (14, 15) of the front frame part (3) is less convex than another of the two front hollow discs and in this way earth flow of peeled off soil flows to a greatest extent past the two rear hollow discs (18, 19) positioned behind at least one of the two front hollow discs.

12. Soil cultivation implement in accordance with claim 1, further comprising holding down devices (30, 31), wherein the hollow discs (5) on the front frame part (3) are assigned the holding-down devices (30, 31) that are positioned behind the hollow discs (5) on the front frame part.

13. Soil cultivation implement in accordance with claim 12, wherein the holding-down devices (30, 31) are constructed as single part or multipart screening elements, which take up the soil peeled off by the hollow discs (5, 6) and deposit it back on the surface of the soil (13), whereby the screening elements are formed flexibly.

14. Soil cultivation implement in accordance with claim 13, wherein the screening elements divert at least part of the soil peeled off and pushed to the side by the hollow discs (5, 6) in an opposite direction again.

15. Soil cultivation implement in accordance with claim 1, wherein the hollow discs (5, 6) have a diameter of between 50 cm and 75 cm.

16. Soil cultivation implement in accordance with claim 1, wherein the offset between the two front hollow discs (14, 15) offset towards each other corresponds to a dimension of about 30% of a diameter of a hollow disc.

17. Soil cultivation implement in accordance with claim 5, wherein the first clearance is about 1.5 times greater than the second clearance.

18. Soil cultivation implement in accordance with claim 7, wherein the offset of the two rear hollow discs (18, 19) in the direction of working (9) corresponds to a dimension of about 50% of a diameter of any of the hollow discs (6).

19. Soil cultivation implement in accordance with claim 12, wherein the holding-down devices (30, 31) are selected from the group consisting of guide parts, tines, harrow tines, screening elements, and combinations thereof.

20. Soil cultivation implement in accordance with claim 15, wherein the hollow discs (5, 6) have a diameter of between 60 cm to 70 cm.

21. Soil cultivation apparatus comprising a frame including a front frame part and a rear frame part, plural hollow discs rotatably and parallelly disposed on the front frame part and on the rear frame part, support arms connecting the rotatable hollow discs to the front frame part and the rear frame part, the plural hollow discs comprising first, second, third and fourth hollow discs, the first hollow discs disposed on the front frame part having first concave and first convex sides and the second hollow discs disposed on the front frame having second concave and second convex sides, the first convex sides and the second convex sides of the first hollow discs and the second hollow discs respectively pointing obliquely to a front and an outer side in a working direction, the third hollow discs disposed on the rear frame part having third concave and third convex sides and the fourth hollow discs disposed on the rear frame part having fourth concave sides and fourth convex sides, the third concave sides and the fourth concave sides of the third hollow discs and the fourth hollow discs respectively pointing obliquely to a front and an inner side in the working direction, chords of the first concave sides of the first hollow discs and the second concave sides of the second hollow discs forming an obtuse angle ($\alpha$) with a soil surface, the frame further comprising a first middle section of the front frame part and a second middle section of the rear frame part, the first hollow discs and the second hollow discs comprising a first adjacent pair of hollow discs along the first middle section having a respective first convex side and second convex side facing each other, the apparatus further comprising a first offset of the first adjacent pair of hollow discs with respect to each other in the working direction relative to other discs of the hollow discs on the front frame part, the third hollow discs and the fourth hollow discs comprising a second adjacent pair of hollow discs along the second middle section having a respective first concave side and second concave side facing each other, and at least one hollow disc of the second adjacent pair of hollow discs disposed left or right of a cultivation strip.

22. The apparatus of claim 21, wherein the first offset is equal to or greater than a portion of a diameter of one of the first adjacent pair of hollow discs.

23. The apparatus of claim 22, wherein a second pair of adjacent hollow discs along the center of the rear frame part has respective concave sides facing each other, and each of the hollow discs of the second adjacent pair of hollow discs is offset with respect to each other and in the working direction.

24. The apparatus of claim 21, further comprising a second offset of the second adjacent pair of hollow discs with respect to each other and in the working direction.

25. The apparatus of claim 24, wherein the second offset is equal to or greater than a portion of a diameter of one of the second adjacent pair of hollow discs.

26. Soil cultivation apparatus comprising a frame including two frame parts positioned in tandem and transversely, hollow discs with swivelling bearings positioned in parallel and connected to the two frame parts through support arms, the two frame parts including a front frame part and a rear frame part, the hollow discs comprising first and second hollow discs on the front frame part and third and fourth hollow discs on the rear frame part, the first hollow discs including first concave sides and first convex sides and the second hollow discs including second concave sides and second convex sides, the third hollow discs including third concave sides and third convex sides and the fourth hollow discs including fourth concave sides and fourth convex sides, the first frame part and the second frame part having a first outer side, a second outer side, a front in a working direction and a center between the first outer side and the second outer side, the first hollow discs having the first concave sides facing the first outer side and the second hollow discs having the second concave sides facing the second outer side, the third hollow discs having the third concave sides facing the center and the fourth hollow discs having the fourth concave sides facing the center, the first hollow discs and the second hollow discs pointing obliquely to the front and to the first and second outer sides, the third hollow discs and the fourth hollow discs pointing obliquely to the front and to the center, chords of the first and the second concave sides of the first and the second hollow discs forming an obtuse angle ($\alpha$) with a soil surface, a first pair of adjacent hollow discs along the center of the front frame part having respective convex sides facing each other, and each of the hollow discs of the first adjacent pair of hollow discs being offset with respect to each other in the working direction relative to other discs of the first and second hollow discs on the front frame part.

* * * * *